United States Patent [19]

Romanowski

[11] 3,968,086

[45] July 6, 1976

[54] DOUBLE FUNNEL DEVICE FOR OXYGENATING SEWAGE

[75] Inventor: Jan W. Romanowski, Montreal, Canada

[73] Assignee: Atara Corporation, Quebec, Canada

[22] Filed: Mar. 13, 1975

[21] Appl. No.: 557,908

Related U.S. Application Data

[63] Continuation of Ser. No. 479,449, June 14, 1974, abandoned, which is a continuation-in-part of Ser. No. 380,694, July 19, 1973, abandoned, which is a continuation of Ser. No. 151,352, June 9, 1972, abandoned.

[30] Foreign Application Priority Data

June 12, 1970  United Kingdom............... 28473/70

[52] U.S. Cl.................................. 261/77; 210/220; 261/123
[51] Int. Cl.² ........................................... B01F 3/04
[58] Field of Search.................. 261/36 R, 77, 79 A, 261/121–124, DIG. 75; 210/220

[56] References Cited

UNITED STATES PATENTS

| | | | |
|---|---|---|---|
| 1,808,424 | 6/1931 | Manifold | 261/77 X |
| 1,960,013 | 5/1934 | Jacobsen | 261/77 |
| 2,353,195 | 7/1944 | Sims | 261/77 |
| 2,416,291 | 2/1947 | Detwiler et al. | 261/77 X |
| 2,582,198 | 1/1952 | Etheridge | 261/77 X |
| 3,452,966 | 7/1969 | Smolski | 261/124 X |
| 3,628,775 | 12/1971 | McConnell et al. | 261/77 |

FOREIGN PATENTS OR APPLICATIONS

| | | | |
|---|---|---|---|
| 46,644 | 4/1889 | Germany | 261/77 |
| 545,187 | 6/1956 | Italy | 261/77 |
| 91,973 | 12/1921 | Switzerland | 261/77 |
| 18,525 | 2/1913 | United Kingdom | 261/77 |

Primary Examiner—Tim R. Miles
Assistant Examiner—Richard L. Chiesa
Attorney, Agent, or Firm—Stevens, Davis, Miller & Mosher

[57] ABSTRACT

A method and an apparatus for continuously aerating sewage is in the form of a gun with a nozzle for producing a jet of oxygen-containing gas and a plurality of funnels converging downstream and arranged downstream of the nozzle and of one another so as to gradually mix the gas into the liquid and to dispense the resultant mixture into more liquid. The result is that the liquid issuing from the gun does so with an even oxygen content and velocity profile, and that any bubbles which may exist are very small and cannot easily coalesce.

5 Claims, 7 Drawing Figures

DOUBLE FUNNEL DEVICE FOR OXYGENATING SEWAGE

This application is a continuation of application Ser. No. 479,449, filed June 14, 1974, now abandoned, which was a continuation-in-part of application Ser. No. 380,694, filed July 19, 1973, now abandoned, which was a continuation of application Ser. No. 151,352, filed June 9, 1972, also now abandoned.

This invention relates to a device for continuously aerating liquids generally, and which is particularly applicable for oxygenating sewage.

Many prior art devices are known and fall into two main classes — the trompe blowing or "burp gun" type and the continuous flow type. The apparatus of my invention belongs generally to the latter class, but differs from them because many continuous flow aerators derive — in some measure — from the idea found in gas scrubbers that interaction takes place at a solid interface and, therefore, larger surface areas and longer or tortuous paths are necessary.

Unfortunately, in both types the oxygen may take the form of discrete bubbles —which though small may eventually reach the surface of the liquid and escape rather than being properly dissolved to satisfy the biological oxygen demand. Yet another cause of inefficiency is that if small bubbles exist they can coalesce together and escape rather than dissolving. Long tortuous paths or a series of baffles reduce liquid flow speeds.

Of course, cutting back of aeration rate may mitigate these faults but, generally speaking, both high aeration efficiency at high aeration rates are required together.

It is therefore an object of this invention to continuously oxygenate liquid at a high rate and at high efficiency.

It is a further object of this invention to ensure even dissolving of the oxygen containing gas in the liquid and more particularly to achieve a distribution of the gas in the liquid which will inhibit coalescence of any bubbles which may have formed.

It is yet another object of this invention to provide a device for carrying out the method without any moving parts; it is another object of the invention to provide a cheap and easily manufactured apparatus for carrying out the method.

By way of example an aeration gun, which incorporates the invention, will now be described with reference to the accompanying drawings in which.

Figures 1, 1A:
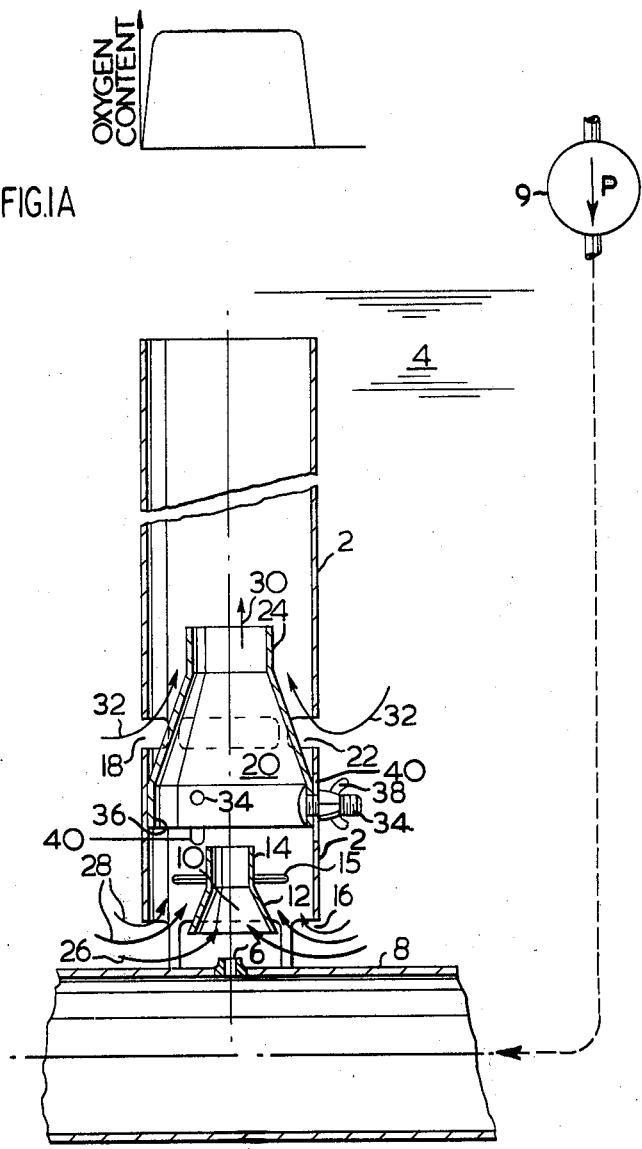
FIG. 1 shows a cross-sectional view of a sewage lagoon aeration gun mounted above an air distribution pipe and FIG. 1A shows an air distribution profile measured by oxygen content.

In FIG. 1 a mixing tube, 2, sometimes called a gun, is installed beneath the surface of a liquid which is, typically, raw sewage, 4. A nozzle 6 is screwed into a gas supply pipe 8 which is usually large enough to have several nozzles without undue pressure drop when in operation. Typically, the gas is compressed air, but it may be oxygen, or any other gas to be dissolved. A conventional air compressor 9 is shown diagrammatically together with means for conveying the air to pipe 8 at nozzle 6.

Immediately above the nozzle, 6, is a funnel 10 with a convergent conical portion 12 and a parallel cylindrical portion 14; the funnel is supported from tube 2 by arms 15. The tube 2 extends downwardly to the pipe 8 so that it is easily mounted thereon and has two inlets at 16 and one at 18 which extend as far round the circumference as is compatible with proper support of the tube.

Above the funnel 10 is a second funnel 20 having a convergent conical portion 22 and a parallel cylindrical portion 24. This second funnel 20 is attached to the wall of the mixing tube 2 between the first and second openings.

In operation, gas issuing from nozzle 6 may by suitable design be fully mixed so that the air distribution profile across the tube 2 is uniform (apart from boundary layer effects) within two diameters of the end of funnel 20, i.e. within about two pipe diameters of the downstream end of cylindrical portion 24.

While I do not wish to be bound by this explanation, I consider that what probably happens is that the fluid though liquid behaves somewhat like a gas, and that mixing of the aerated liquid with unaerated liquid must take place in the turbulence of the expansion which follows rapid flow through a convergent funnel. The pressure drop caused by the expansion increases bubblesize; these rupture easily on turbulent mixing with a stream of unaerated liquid.

Thus, I have found that for aerating sewage a ⅜ inch diameter orifice in the nozzle, 6, is suitable for a 5 lb/sq inch air pressure line with a 12 inch diameter tube gun 2. This will give a flow of about 7.7 cubic feet per minute if the orifice is submerged at a depth of 8 feet, 6 inches in liquid sewage.

In the double convergent nozzle gun that I have shown in FIG. 1, I have achieved excellent results when the first inlet 16 is 3½ inches high. The first funnel 10 is spaced 2½ inches from the top of the pipe 8 and this allows the raw liquid flow, induced by air flowing through the orifice, to bifurcate into two inlet streams, 26 and 28. The air issuing from the orifice is broken up into small bubbles by the turbulence caused by the velocity increase of the fluid in the convergent portion 12.

After stream 26 has passed through the inverted funnel 10 it rejoins stream 28 and, under the influence of funnel 20, these streams become intermixed as stream 30. This stream in its turn induces flow of raw sewage through the third inlet 18 which is 2 inches wide in a stream 32 as indicated. The turbulence of the flow and the relative low velocity, large area and air distribution in stream 30 is such that good intermixing of stream 30 and 32 takes place, without the necessity for further eddy producing devices; and this intermixing occurs within two tube diameters of the end 24 of funnel 20. The axial distance between the first and second inlets on the one hand and the third inlet on the other is about one pipe diameter and thus an even air distribution profile may be achieved in about three tube diameters of the air nozzle 6; such a profile is shown in FIG. 1A.

Of course, the assembly which will give the best results will depend on the liquid and gas to be mixed, and particularly the gas pressure, the liquid density, viscosity, surface tension, and temperature. Nevertheless, I have found that in the gun described above, good results are achieved by making the first funnel 10 with an initial diameter at the large end of 6½ inches which reduces to 3 inches over an axial length of 3 inches to give a half cone angle of between 30° and 31°. This is followed by a straight portion of 3 inches diameter, which is also 3 inches long.

The minimum diameter of the first funnel is therefore 6 inches downstream from a ⅜ inch diameter orifice, which; the Venturi throat is located about 16 orifice diameters downstream from the orifice, as illustrated in FIG. 1 of the drawing. This ratio which is not very critical reflects the different properties of the fluids to be mixed that is, oxygen, air or some other oxygen containing gas, with sewage which is basically water containing variable amounts of organic matter in solution, suspension or as a mixture.

It will also be seen that the first funnel minimum diameter is about one quarter of that of the tube, and the second funnel minimum diameter is about half that of the tube.

The second funnel 20, at the large end of the convergent conical portion is the full diameter of the tube, i.e. 12 inches and reduces to 6 inches over an axial length of 7¾ inches to give a half cone angle of just over 21°; this is followed by a straight portion of 6 inches diameter, 3 inches long. This funnel is located with respect to the third raw liquid inlet 18, whose centre line should be between ½ and ⅔ of the way up the cone frustum.

Although the second funnel is located relative to the third raw liquid inlet it must be understood that it cooperates with the first funnel to produce proper mixing and aeration. It is clearly not possible to cover all combinations of variables mentioned above, and dimensional analysis is exceedingly complex particularly when some quantities may vary so that any specific configuration is a compromise for the midpoint average of three or more parameters, each of which may vary continuously and independently through a range.

Figure 2A:
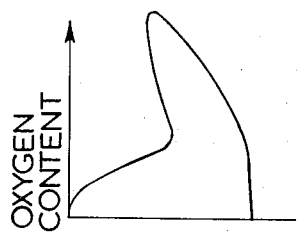
FIGS. 2, 2A, 3 and 3A illustrate qualitatively the types of fault which can occur if due care is not taken in design or operation.
Figure 2:
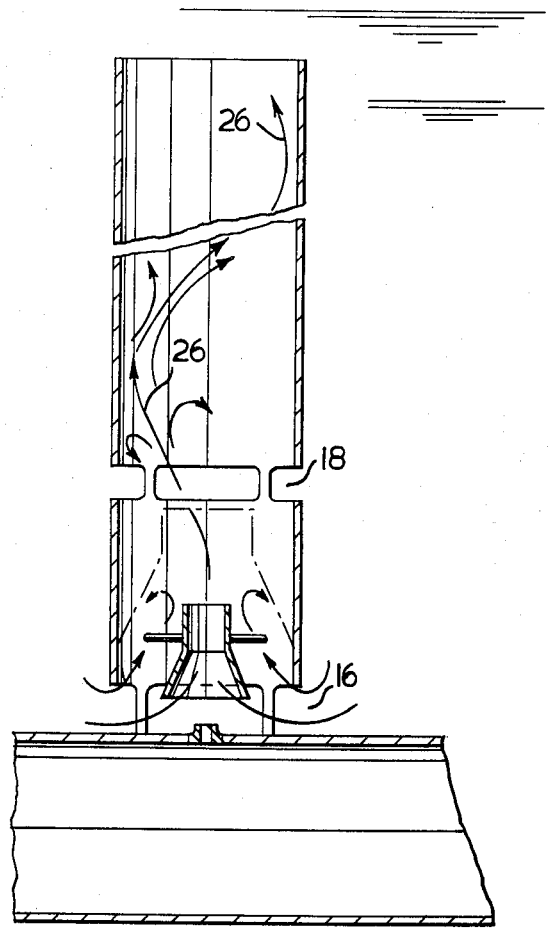

Nevertheless, some general rules for achieving successful results can be given. If the distance between the two funnels is too small - that is, if inlet 18, with funnel 20, is moved too close to inlet 16 (or is used with too large an angle) then the stream 28 tends to be choked and the stream 26 tends to be extended so as to give a poor air distribution profile. A high speed core tends to form which is somewhat unstable, of generally helical form and it moves randomly around a circle adjacent the periphery of the tube. This type of distribution also occurs when the second funnel is omitted completely and the effect and air distribution profile is shown in FIGS. 2 and 2A. It will be understood that the positon of the third raw liquid inlet 18, with the funnel in the chain dotted position, has been omitted for the sake of clarity.

Figure 3A:
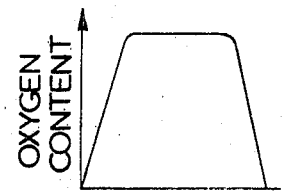
Figure 3:
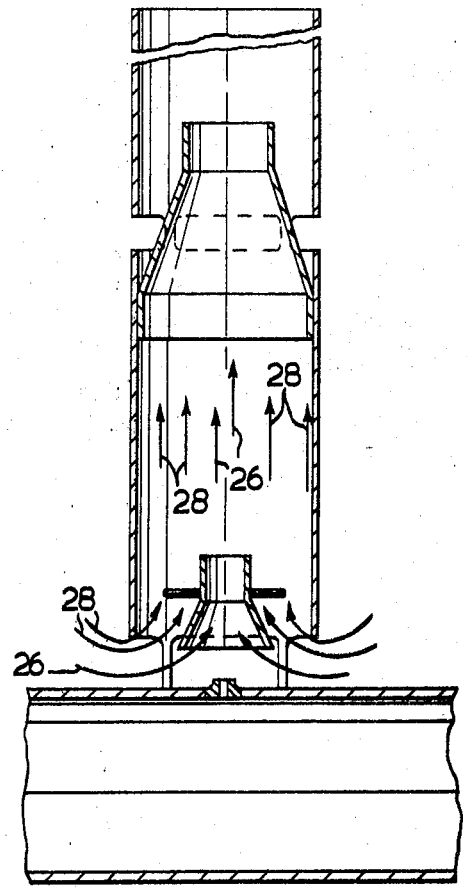

On the other hand, if the second funnel is moved downstream, as illustrated in FIG. 3, the air distribution profile may be more or less satisfactory at the exit but the liquid is not properly aerated because the bubbles have coalesced before proper mixing in the second funnel. The bubbles are too large and the result is less efficient gas-liquid interaction.

From what has been described further above, it will be understood that it is possible that a design which is less than optimum for one set of conditions may work very well by varying one or more of those conditions; that if the second funnel appears to be too far downstream, the effect may in part be cured by raising the air pressure and that the dimensions are not critical, but best results will probably be achieved by trial and error. For this reason, I prefer to make funnel 20 and tube 2 so that adjustment can be made of the axial position of the tube. While this can be done in any convenient manner, I use studs 34 on the funnel skirt 36 with wing nuts 38, with longitudinal slots 40 in that portion of tube gun 2, between the inlets at 16 and inlet 18.

Figure 4:
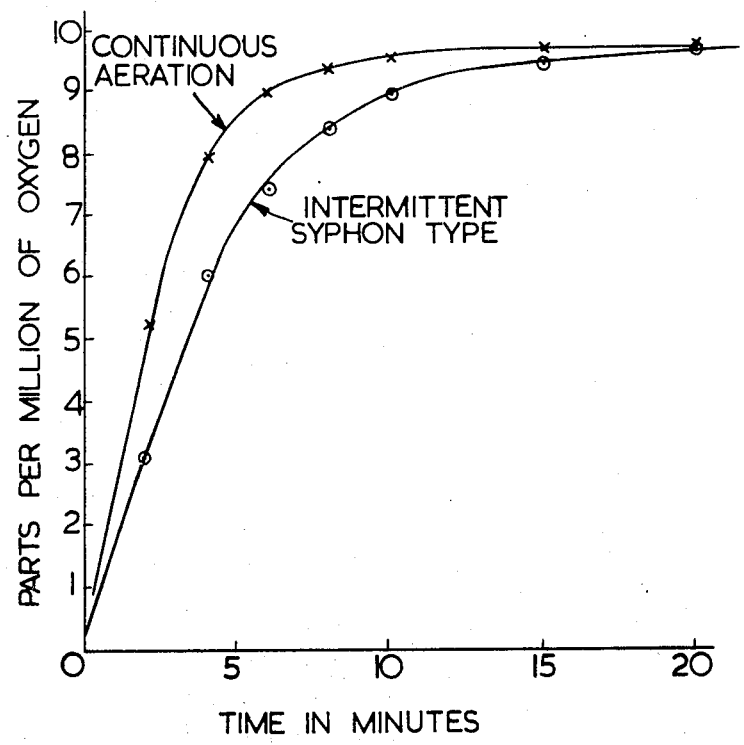
FIG. 4 is a graph showing the rate of aeration achieveable by this apparatus compared with a prior art intermittent siphon operated apparatus.

The graph of FIG. 4 shows that this type of aeration is considerably more efficient as the intermittent siphon type of apparatus which has been used heretofore; and which is illustrated in Canadian Pat. No. 746,669; that is, the same volume of liquid was raised to 9 parts per million of oxygen in 6 minutes as against 10 minutes for the prior art.

I claim:

1. An apparatus for oxygenating liquid sewage, comprising:
   means for supplying a pressurized oxygen-containing gas, said means including an orifice for issuing a continuous stream of said gas upwardly from below the top surface of a volume of liquid sewage;
   a first funnel means;
   means to secure said first funnel means at a location downstream from said orifice, said first funnel converging in the downstream direction, the upstream opening of said first funnel comprising a first inlet for entraining liquid sewage into said first funnel by gas issuing in the downstream direction from said orifice;
   a second funnel extending downstream from the downstream opening of said first funnel means;
   means to secure said second funnel means in a predetermined relationship to said first funnel, said second funnel converging in the downstream direction, the upstream opening of said second funnel comprising a second inlet for entraining liquid sewage into said second funnel by sewage and gas issuing from the downstream opening of said first funnel;
   and an exit tube of substantially constant diameter extending both upstream and downstream from the downstream opening of said second funnel, an upstream opening cut in said exit tube comprising a third inlet for entraining liquid sewage into said exit tube by liquid sewage and gas issuing from the downstream opening of said second funnel;
   means for securing the exit tube to said gas supplying means;
   and wherein the first and second funnel securing means comprise means for mounting said first and second funnels within the upstream extension of said tube, whereby said funnels are secured in said predetermined relationship to one another and to said orifice.

2. The apparatus of claim 1, wherein said means for mounting said second funnel comprises means for adjusting the position of said second funnel with respect to said first funnel.

3. The apparatus of claim 2, wherein said adjusting means is accessible from the exterior of said tube.

4. The apparatus of claim 1, wherein the distance between said second inlet and said third inlet is about equal to the diameter of said tube.

5. The apparatus of claim 1, wherein the minimum diameter of said first funnel at the upstream opening is about one quarter of the diameter of said tube.

* * * * *